(12) United States Patent
Huang

(10) Patent No.: US 9,915,773 B1
(45) Date of Patent: Mar. 13, 2018

(54) BACKLIGHT MODULE AND STEREO DISPLAY DEVICE USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/626,169

(22) Filed: Jun. 18, 2017

(30) Foreign Application Priority Data

Apr. 28, 2017 (CN) .......................... 2017 1 0293872

(51) Int. Cl.
*F21V 8/00* (2006.01)
*H04N 13/04* (2006.01)

(52) U.S. Cl.
CPC ............. *G02B 6/005* (2013.01); *G02B 6/003* (2013.01); *G02B 6/0036* (2013.01); *H04N 13/0404* (2013.01); *H04N 13/0447* (2013.01)

(58) Field of Classification Search
CPC ...... G02B 6/005; G02B 6/003; G02B 6/0036; H04N 13/0404; H04N 13/0447
See application file for complete search history.

(56) References Cited

U.S. PATENT DOCUMENTS

| 9,519,153 | B2 | 12/2016 | Robinson et al. |
| 9,807,375 | B2 * | 10/2017 | Jung ................. H04N 13/0404 |
| 2011/0001803 | A1 * | 1/2011 | De Zwart .......... H04N 13/0404 |
| | | | 348/51 |

FOREIGN PATENT DOCUMENTS

| CN | 100376924 C | 3/2008 |
| TW | I343500 B | 6/2011 |

* cited by examiner

*Primary Examiner* — Anne Hines
(74) *Attorney, Agent, or Firm* — CKC & Partners Co., Ltd.

(57) ABSTRACT

A backlight module includes a light source component and a light guide plate. The light guide plate includes at least one micro-structure on a bottom surface of the light guide plate, and the micro-structure includes a plane reflective surface. The light source component includes light source groups, a first cylindrical lens array and a second cylindrical lens. Each of the light source groups includes a first light source and a second light source arranged along an X direction. The first cylindrical lens array is optically coupled between the light source groups and the light guide plate, and includes first cylindrical lenses having lens power along the X direction and disposed corresponding to each of the light source groups. The second cylindrical lens is optically coupled between the light source groups and the light guide plate, and has lens power along a Z direction orthogonal to the X direction.

12 Claims, 10 Drawing Sheets

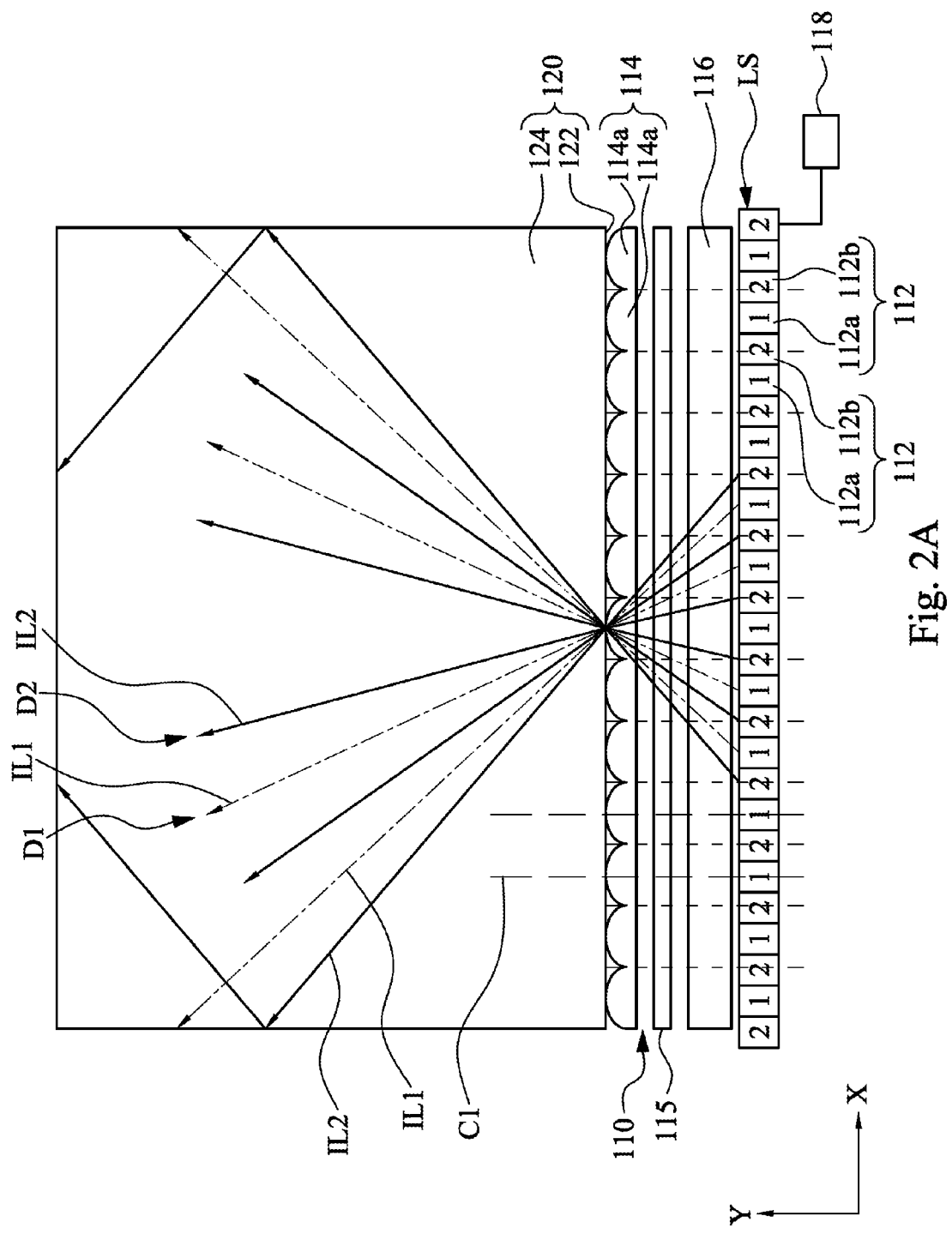

BACKLIGHT MODULE AND STEREO DISPLAY DEVICE USING THE SAME

RELATED APPLICATIONS

This application claims priority to China Application Serial Number 201710293872.5, filed Apr. 28, 2017, which is herein incorporated by reference.

BACKGROUND

Field of Invention

The present invention relates to a backlight module and a stereo display device using the same.

Description of Related Art

In recent years, with the increasing development of virtual reality technology, an optical product which can show a stereoscopic image has become a focal point in the consumer market. In general, a stereoscopic display device can respectively provide different images to two eyes of an observer, and the eyes of the observer can respectively receive different image information, so that the observer can perceive a stereoscopic image by exploiting the binocular parallax of typical human sight.

Generally, an autostereoscopic display device may respectively transmit light beams of different images to two eyes of the observer based on a time-multiplexed method or a spatial-multiplexed method. As a result, the observer may perceive a stereoscopic image without wearing glasses, thus increasing user's comfort and convenience. However, how to further improve optical characteristics of the autostereoscopic display and provide a multi-viewable function of the autostereoscopic display has become one of the most important research and development issues, and there is an urgent need for improvement in the related fields.

SUMMARY

In the embodiments of the present invention, the cylindrical lens array and the light guide plate having reflective micro structures are designed in an edge-lit backlight module, so that exiting lights may keep their light distribution resulting from the cylindrical lens array. The light distribution may be designed in accordance with another cylindrical lens array, so that light may be focused onto a display panel of the stereo display device. In the embodiments of the present invention, through the edge-lit backlight module, the thickness of the stereo display device may be reduced, and the number of the light-emitting diode light source may be lowered while high power light sources are used.

According to some embodiments of the present invention, a backlight module includes a light guide plate and a light source component. The light guide plate has a light incident surface, a bottom surface, and a light exit surface, the light incident surface adjoins the bottom surface and the light exit surface, the light guide plate includes a micro structure on the bottom surface, and the micro structure of the light guide plate has a plane reflective surface. The light source component includes light source groups, a first cylindrical lens array, and a second cylindrical lens. Each of the light source groups includes a first light source and a second light source, and the first light source and the second light source are arranged along an X direction and configured to time sequentially provide a first light and a second light respectively. The first cylindrical lens array is optically coupled between the light source groups and the light guide plate, the first cylindrical lens array includes a plurality of first cylindrical lenses having optical power along the X direction, and each of the light source groups is disposed corresponding to each of the first cylindrical lenses. The second cylindrical lens is optically coupled between the light source groups and the light guide plate. The second cylindrical lens has optical power along a Z direction orthogonal to the X direction, and the first cylindrical lens array and the second cylindrical lens are configured to turn the first lights and the second lights coming from the light source groups into a first lateral incident light propagating along a first direction distribution and a second lateral incident light propagating along a second direction distribution respectively, and the light incident surface of the light guide plate is configured to receive the first lateral incident light and the second lateral incident light, and the plane reflective surface of the micro structure of the light guide plate is configured to turn the first lateral incident light and the second lateral incident light into a first exiting light of the first direction distribution and a second exiting light of the second direction distribution leaving the light guide plate from the light exit surface respectively, and the first direction distribution is different from the second direction distribution.

In some embodiments of the present invention, the first light source and the second light source of each of the light source groups have different distances away from an optical axis of corresponding each of the first cylindrical lenses.

In some embodiments of the present invention, the first light source and the second light source of each of the light source groups are disposed on a focal plane of corresponding each of the first cylindrical lenses.

In some embodiments of the present invention, the plane reflective surface is formed in parallel with the X direction.

In some embodiments of the present invention, the first light source and the second light source of the light source groups is disposed on a focal plane of the second cylindrical lens.

In some embodiments of the present invention, the backlight module further includes a controller configured to control the first light source and the second light source of the light source groups to time sequentially provide the first light and the second light.

In some embodiments of the present invention, the micro structure of the light guide plate includes a reflective material on the plane reflective surface of the micro structure.

According to some embodiments of the present invention, a stereo display device includes the aforementioned backlight module, a third cylindrical lens array, a display module, and a fourth cylindrical lens array. The third cylindrical lens array is disposed on the light exit surface, the third cylindrical lens array is configured to focus the first exiting light and the second exiting light coming from the light exit surface into a first slant strip light and a second slant strip light respectively. The display module is disposed on a focal plane of the third cylindrical lens array opposite the light guide plate, wherein the display module includes at least one sub-pixel configured to turn the first slant strip light into a first pixel light and turn the second slant strip light into a second pixel light. The fourth cylindrical lens array is disposed on a side of the display module opposite the light guide plate, and the fourth cylindrical lens array is configured to direct the first pixel light into a first view region and direct the second pixel light into a second view region.

In some embodiments of the present invention, the stereo display device includes a fifth cylindrical lens array including plural fifth cylindrical lenses disposed at a side of the fourth cylindrical lens array opposite the light guide plate, the fourth cylindrical lens array includes plural fourth cylindrical lenses, and an arrangement direction of the fourth cylindrical lenses is orthogonal to an arrangement direction of the fifth cylindrical lenses.

In some embodiments of the present invention, the subpixels are arranged along the X direction, the third cylindrical lens array includes plural third cylindrical lenses, the fourth cylindrical lens array includes plural fourth cylindrical lenses, and a long axis of the third cylindrical lenses and a long axis of the fourth cylindrical lenses tilt with respect to the X direction.

In some embodiments of the present invention, an arrangement direction of the third cylindrical lenses is parallel to an arrangement direction of the fourth cylindrical lenses.

In some embodiments of the present invention, the display module is disposed on a focal plane of the fourth cylindrical lens array.

It is to be understood that both the foregoing general description and the following detailed description are illustrated by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2A is a top view of a backlight module of the stereo display device of FIG. 1;

DETAILED DESCRIPTION

Figure 1:
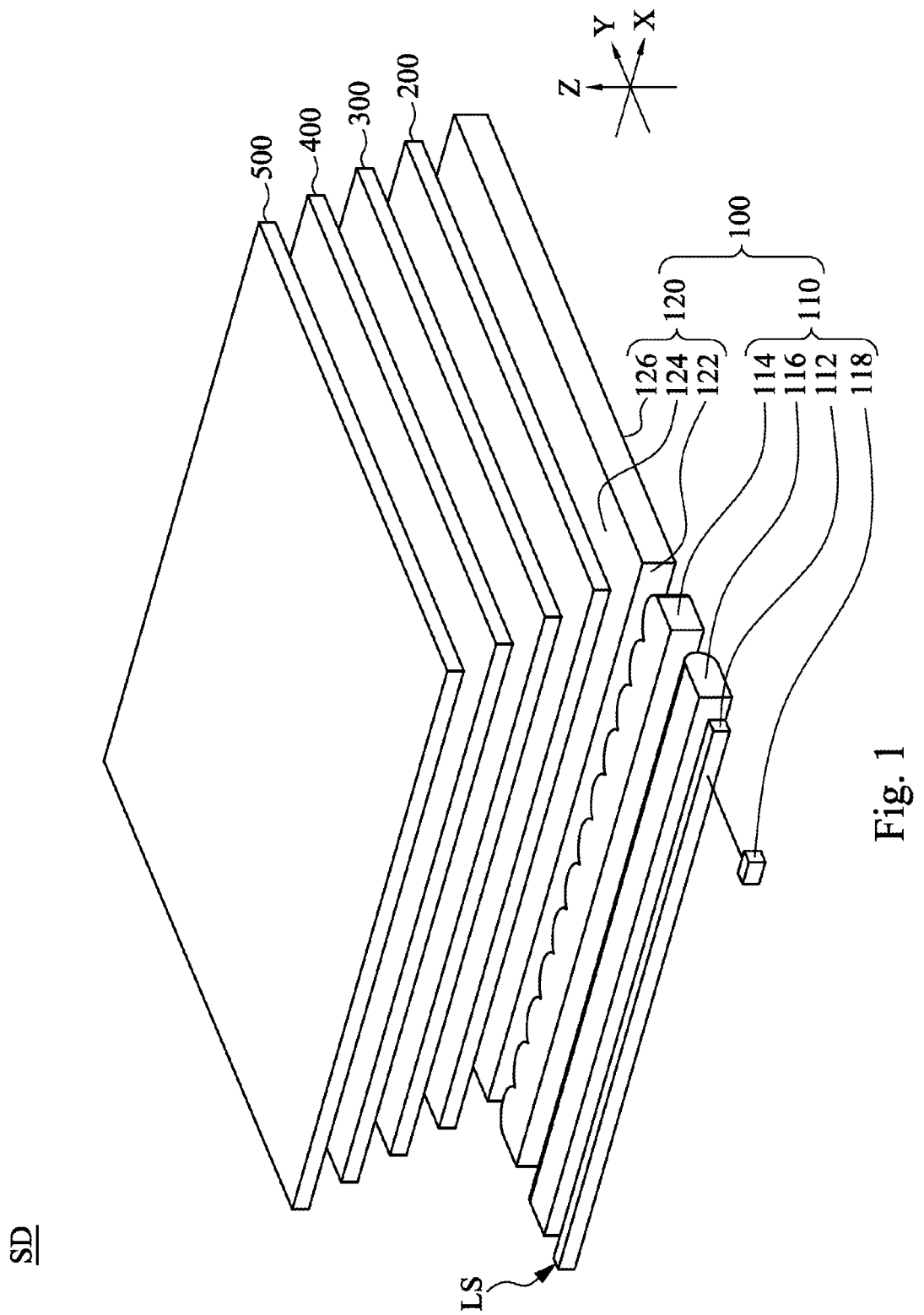
FIG. 1 is a schematic stereo view of a stereo display device according to some embodiments of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic stereo view of a stereo display device SD according to some embodiments of the present invention. The stereo display device SD includes a backlight module 100, a third cylindrical lens array 200, a display module 300, a fourth cylindrical lens array 400, and a fifth cylindrical lens array 500. The backlight module 100 is illustrated first in the following, and then the other elements would be illustrated.

First of all, the backlight module 100 includes a light source component 110 and a light guide plate 120. The light guide plate 120 has a light incident surface 122, a light exit surface 124, and a bottom surface 126. The light incident surface 122 adjoins the light exit surface 124, and the light exit surface 124 and the bottom surface 126 are opposite each other. The light source component 110 is configured to time sequentially provide two groups of incident lights propagating along different directions toward the light incident surface 122 of the light guide plate 120. The light guide plate 120 is configured to convert the two groups of incident light propagating along the directions into two groups of exiting light propagating along different directions.

Figure 2B:
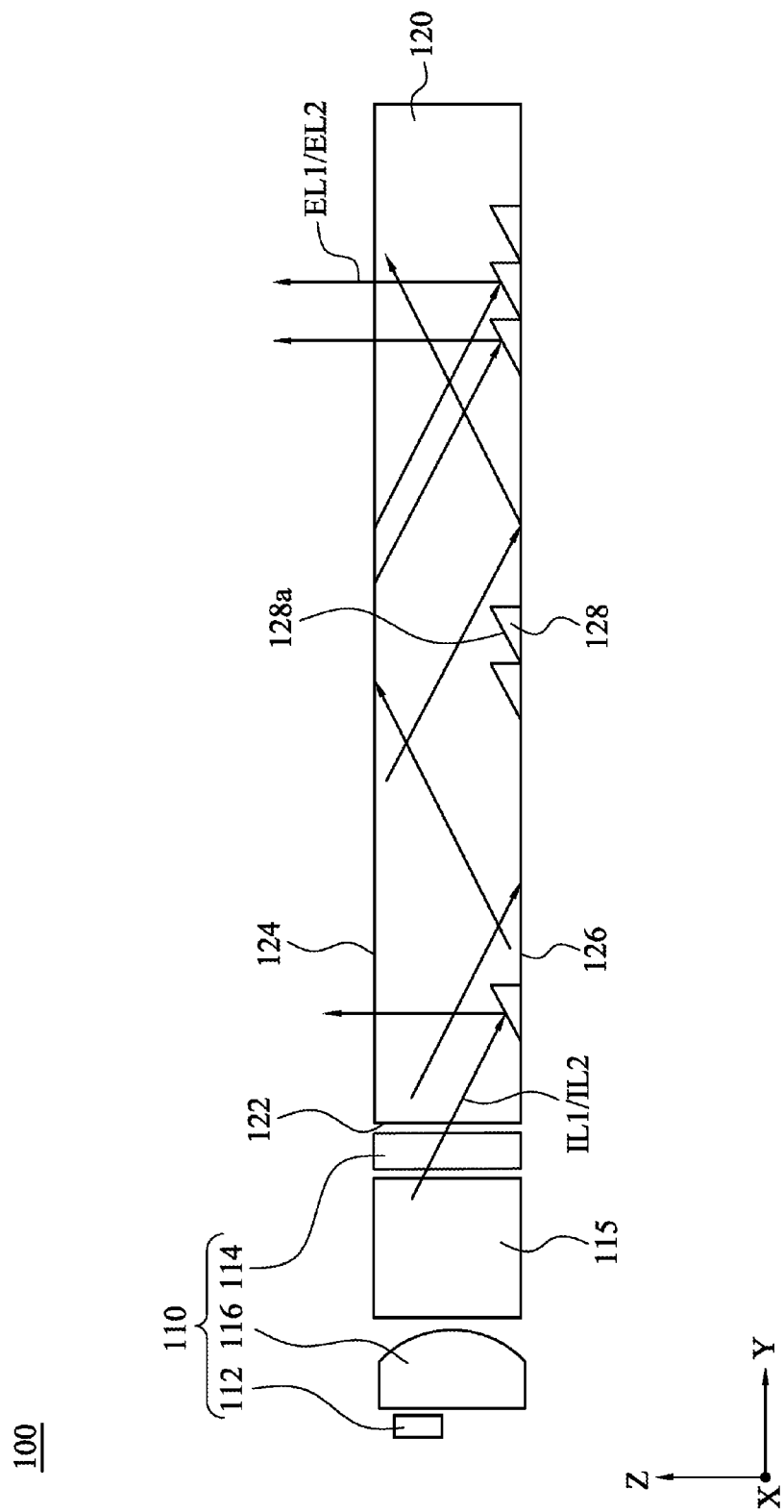
FIG. 2B is a side cross-sectional view of the backlight module of FIG. 2A.

To be specific, reference is made to FIG. 2A and FIG. 2B. FIG. 2A is a top view of a backlight module 100 of the stereo display device SD of FIG. 1. FIG. 2B is a side cross-sectional view of the backlight module 100 of FIG. 2A. In the present embodiments, the light source component 110 includes light source groups 112, a first cylindrical lens array 114, a second cylindrical lens 116, and a controller 118. In the present embodiments, the light source groups 112 are arranged repeatedly and forms a light bar LS. Each of the light source groups 112 includes a first light source 112a and a second light source 112b, and the first light source 112a and the second light source 112b are arranged along an X direction. In the present embodiments, the first cylindrical lens array 114 is optically coupled between the light source groups 112 and the light guide plate 120, the first cylindrical lens array 114 includes plural first cylindrical lenses 114a having optical power along the X direction. The second cylindrical lens 116 is optically coupled between the light source groups 112 and the light guide plate 120. The second cylindrical lens 116 has optical power along a Z direction orthogonal to the X direction. The controller 118 is electrically connected with the first light sources 112a and the second light sources 112b, and time sequentially control the first light sources 112a and the second light sources 112b to provide first lights and second lights (not shown) respectively.

In the embodiments of the present invention, the first cylindrical lens array 114 is disposed between the second cylindrical lens 116 and the light guide plate 120, but it should not limit the scope of the present invention. In other embodiments, the first cylindrical lens array 114 may be disposed between the second cylindrical lens 116 and the light bar LS. The first cylindrical lens array 114 is configured to provide lens power in the X direction, and the second cylindrical lens 116 is configured to provide lens power in the Z direction. As FIG. 2A shows, through the second cylindrical lens 116 and one of the first cylindrical lenses 114a, the first lights (not labeled) coming from the first light sources 112a are converted to a first lateral incident light IL1 propagating along a first direction distribution (including plural first directions D1), and the second lights (not labeled) coming from the second light sources 112b are converted to a second lateral incident light IL2 propagating along a second direction distribution (including plural second directions D2). The first directions D1 are different from the second directions D2.

To be specific, one of the first cylindrical lenses 114a of the first cylindrical lens array 114, which provides lens power in the X direction, may focus the first light sources 112a and the second light sources 112b at different positions on the X direction with different angles respectively, and the second cylindrical lens 116, which provides lens power in the Z direction may focus the first light sources 112a and the second light sources 112b at the same position on the Z direction with the same angles respectively. Herein, each of the first cylindrical lenses 114a converts the first lights and the second lights into the first lateral incident light IL1 with the first direction distribution (including the first directions D1) and the second lateral incident light IL2 with the second direction distribution (including the second directions D2). Through the configuration, the first direction distribution (including the first directions D1) the first lateral incident light(s) IL1 propagating along and the second direction distribution (including the second directions D2) the second lateral incident light(s) IL2 propagating along have different components in at least the X direction, while the first direction(s) D1 and the second direction(s) D2 have substantially the same components in the Z direction, such that the first directions D1 are different from the second directions D2.

In some embodiments, the light source component 110 may further include a transparent plate 115 (referring to FIG. 2B) disposed between the first cylindrical lens array 114 and the second cylindrical lens 116, thereby adjusting a distance between the first cylindrical lens array 114 and the second cylindrical lens 116 and improving transmission of light. In some embodiments, the first cylindrical lens array 114 and/or the second cylindrical lens 116 may be adhered to the transparent plate 115.

In some embodiments of the present invention, each of the light source groups 112 is disposed corresponding to each of the first cylindrical lenses 114a, and the first light source 112a and the second light source 112b of each of the light source groups 112 have different distances away from an optical axis C1 of corresponding each of the first cylindrical lenses 114a. For example, herein, the first light sources 112a are located on the optical axes C1 of the first cylindrical lenses 114a, and the second light sources 112b are not located on the optical axes C1 of the first cylindrical lenses 114a. Through the configuration, the first direction distribution (including the first directions D1) the first lateral incident light(s) IL1 propagating along and the second direction distribution (including the second directions D2) the second lateral incident light(s) IL2 propagating along have different components in at least the X direction, and the positions of the first lateral incident light IL1 and the second lateral incident light IL2 are interlaced with each other in the X direction. In other embodiments, the first light sources 112a and the second light sources 112b may not be disposed at the optical axes C1 of the first cylindrical lenses 114a, and the first light sources 112a and the second light sources 112b have different distances away from the optical axes C1. Herein, "each of the light source groups 112 is disposed corresponding to each of the first cylindrical lenses 114a" means that a pitch between two adjacent light source groups 112 is substantially the same as a pitch between two adjacent first cylindrical lenses 114a.

In some embodiments of the present invention, the first light sources 112a and the second light sources 112b may be white light sources, such as blue light-emitting chips with yellow fluorescent gels. It is noted that, each of the light source groups 112 is not limited to include only the first light source 112a and the second light source 112b operating time sequentially. In other embodiments, the light source groups 112 may include three or more light sources operating time sequentially.

In some embodiments of the present invention, the first light sources 112a and the second light sources 112b are diverging point light sources, in which the degree of divergence depends on the inner structure and the fabrication quality of the light source. For preventing the divergence property of the light sources from affecting a coupling efficiency of the light guide plate, in some embodiments of the present invention, the first light source 112a and the second light source 112b of each of the light source groups 112 are disposed on a focal plane of corresponding each of the first cylindrical lenses 114a, and the first light source 112a and the second light source 112b of each of the light source groups 112 are disposed on a focal plane of the second cylindrical lenses 116. Through the configuration, diverging lights (e.g., the first light and second light mentioned previously) coming from the first light sources 112a and the second light sources 112b may be well converted into parallel lights (e.g., the first lateral incident lights IL1 and the second lateral incident lights IL2, which are more flat), thereby enhancing the coupling efficiency of the light guide plate.

In the present embodiments, through the configuration, the controller 118 may control the light source component 110 to provide the first lateral incident lights IL1 and the second lateral incident lights IL2 time sequentially.

As such, since the optical power of the first cylindrical lens array 114 varies along the X direction, and the first light source 112a and the second light source 112b are arranged along X direction, the light source component 110 may provide the first lateral incident light(s) IL1 propagating along the first direction distribution (including the first directions D1) and the second lateral incident light(s) IL2 propagating along the second direction distribution (including the second directions D2) time sequentially, in which the first directions D1 are different from the second directions D2.

In the some embodiments of the present invention, being coupled into the light guide plate 120, the first lateral incident lights IL1 and the second lateral incident lights IL2 propagate in the light guide plate 120, and directions of the propagation are kept since the first lateral incident lights IL1 and the second lateral incident lights IL2 are reflected by total internal reflection.

In the some embodiments of the present invention, the light guide plate 120 includes at least one micro structure 128 disposed on the bottom surface 126. The micro structures 128 are formed with plane reflective surfaces 128a in parallel with the X direction. Because of the coordination of the light source groups 112 and the second cylindrical lens 116, the first direction distribution (including the first directions D1) the first lateral incident light(s) IL1 propagating along and the second direction distribution (including the second directions D2) the second lateral incident light(s) IL2 propagating along have substantially the same components in the Z direction. For example, in FIG. 2B, observing from the Y-Z plane, the first lateral incident light IL1 and the second lateral incident light IL2 propagates in the same direction. Through the configuration, observing from the Y-Z plane, the plane reflective surfaces 128a may reflect the first lateral incident light IL1 and the second lateral incident light IL2 toward the same Z direction, in which the propagating directions of the first lateral incident light IL1 and the second lateral incident light IL2 having the same component in the Z direction. As a result, the light guide plate 120 may turn the first lateral incident lights IL1 and the second lateral incident lights IL2 coming from the light incident surface 122 into first exiting lights EL1 and second exiting lights EL2 leaving the light guide plate 120 from the light exit surface 124 respectively. In some examples, the micro structures 128 may have a long shape extending along the X direction with a triangular cross section. In other embodiments, the micro structure 128 may have other shapes having the above function, such as a quadrangular pyramid.

In some embodiments of the present invention, the micro structures 128 may be reflective mirrors. For example, the micro structures 128 may include a reflective material, such as silver, aluminum, and copper. Alternatively, in other embodiments, the reflective material may be formed in micro recesses which are formed on the bottom surface 126 of the light guide plate 120, and other portions of the micro recesses may be filled with appropriate filling materials. For example, bottom surfaces of the micro recesses may be coated with reflective layers, thereby forming the plane reflective surfaces 128a.

Figure 3:
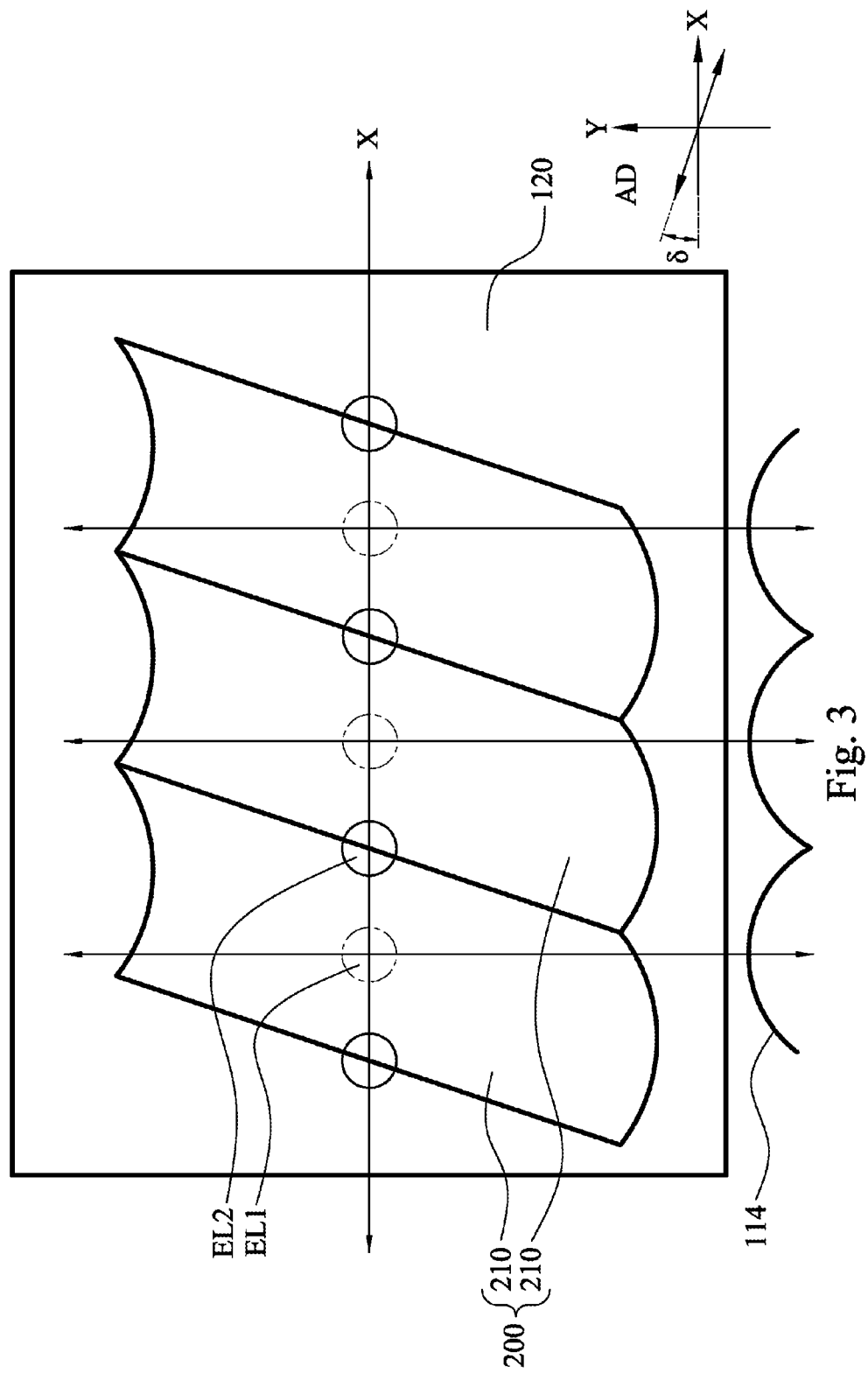
FIG. 3 is a schematic view of exiting lights of a backlight module of a stereo display device according to some embodiments of the present invention.

Reference is made to FIG. 2B and FIG. 3. FIG. 3 is a schematic view of exiting lights of the backlight module 100 of the stereo display device SD according to some embodiments of the present invention. In some embodiments, the first exiting lights EL1 and the second exiting lights EL2 are area lights coming from the light exit surface 124 of the light guide plate 120 but have different direction distributions. For ease of illustration, circles of dashed lines and circles of solid lines are depicted, in which the circles of dashed lines respectively indicate the first exiting lights EU of the first direction distribution being viewed at infinity, and the circles of solid lines respectively indicate the second exiting lights EL2 of the second direction distribution being viewed at infinity. At one time, the first exiting lights EL1 or the second exiting lights EL2 are present. As aforementioned, herein, the first lateral incident light IL1 and the second lateral incident IL2 respecitvely propagate along a first direction distribution and a second direction distribution in the X direction, and then be turned into the first exiting light EL1 of the first direction distribution and the second exiting light EL2 of the second direction distribution repectively by the plane reflective surfaces 128a of the micro structures 128. As the figure shows, being processed by the first cylindrical lens array 114, the circles of dashed lines and solid lines are disposed corresponding to the first cylindrical lenses 114a of the first cylindrical lens array 114, and the circles of dashed lines and solid lines are alternately arranged in the X direction.

Figure 4:
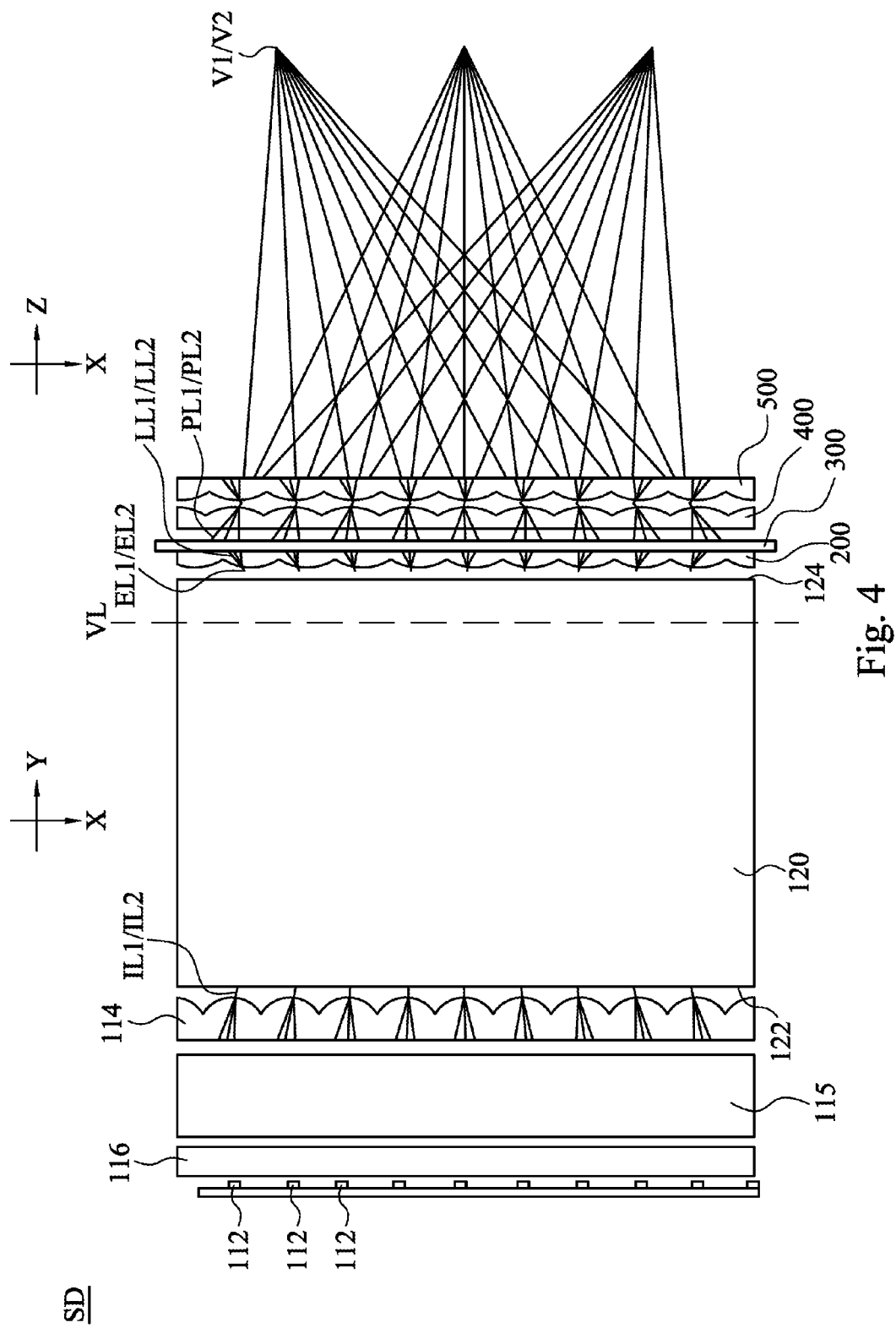
FIG. 4 is a plane optical schematic view of a stereo display device according to some embodiments of the present invention.
Figure 5:
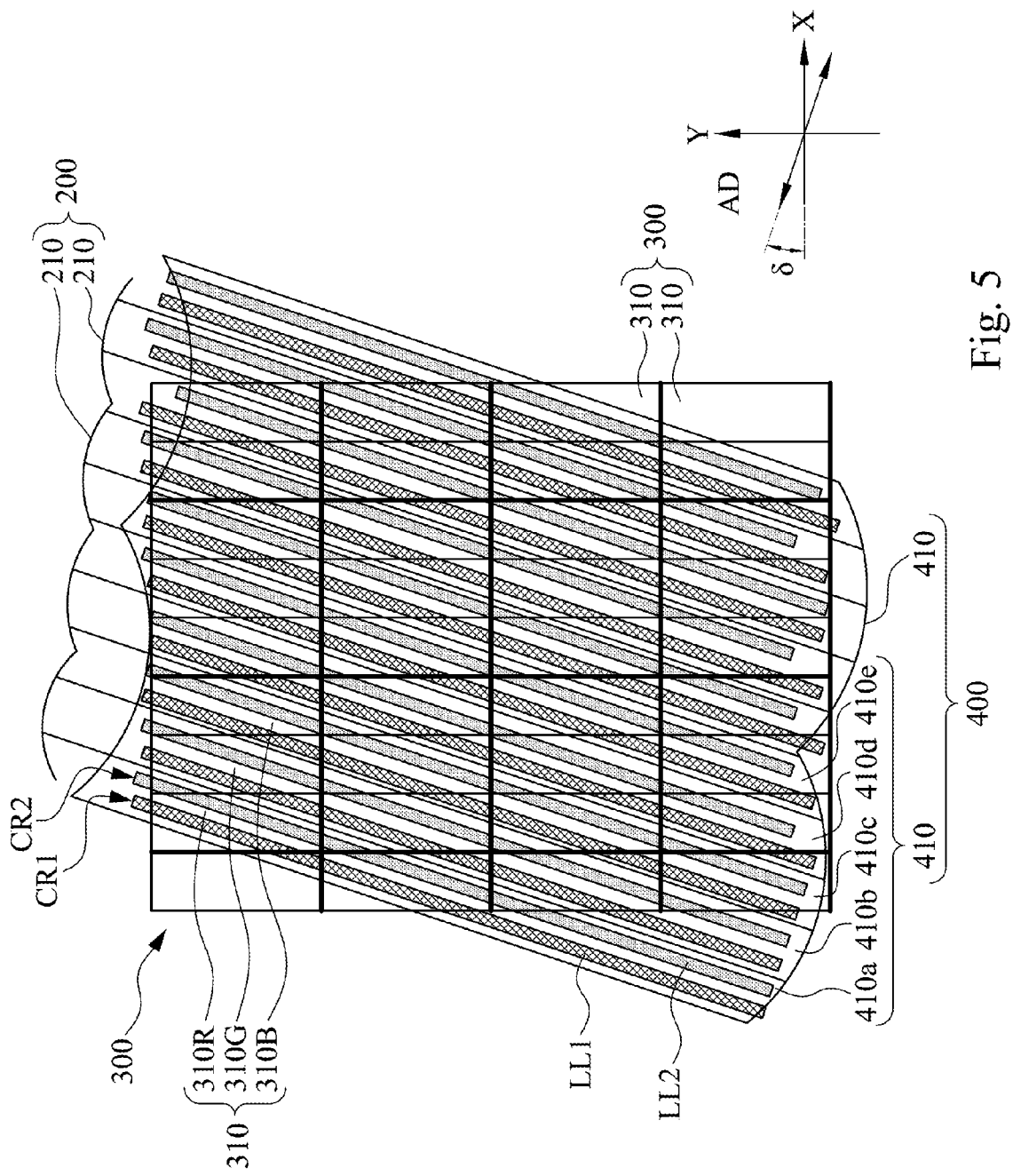
FIG. 5 is a plane schematic view of a portion of a display module of a stereo display device according to some embodiments of the present invention.

Reference is made to FIG. 3, FIG. 4, and FIG. 5. FIG. 4 is a plane optical schematic view of the stereo display device SD according to some embodiments of the present invention. A left side of a virtual line of FIG. 4 represents the structure and optical paths when lights propagate along the Y direction, while a right side of the virtual line of FIG. 4 represents the structure and optical paths when lights are reflected by the light guide plate 120 and turned to propagate along the Z direction. Herein, the left and right sides of the virtual line are respectively related to the X-Y plane and the X-Z plane, in which the X, Y, Z directions are orthogonal to each other. FIG. 5 is a plane schematic view of a portion of the display module 300 of the stereo display device SD according to some embodiments of the present invention. In some embodiments of the present invention, the third cylindrical lens array 200 is disposed at the light exit surface 124 of the light guide plate 120, and configured to focus the first exiting lights EL1 coming from the light exit surface 124 into first slant strip lights LL1, and focus the second exiting lights EL2 coming from the light exit surface 124 into second slant strip lights LL2. Herein, referring to FIGS. 3 and 5, by designing the focal length of the first cylindrical lens array 114 and the focal length of the third cylindrical lens array 200, the first exiting lights EL1 are focused into the first slant strip lights LL1, and the second exiting lights EL2 are focused into the second slant strip lights LL2.

Figure 6:
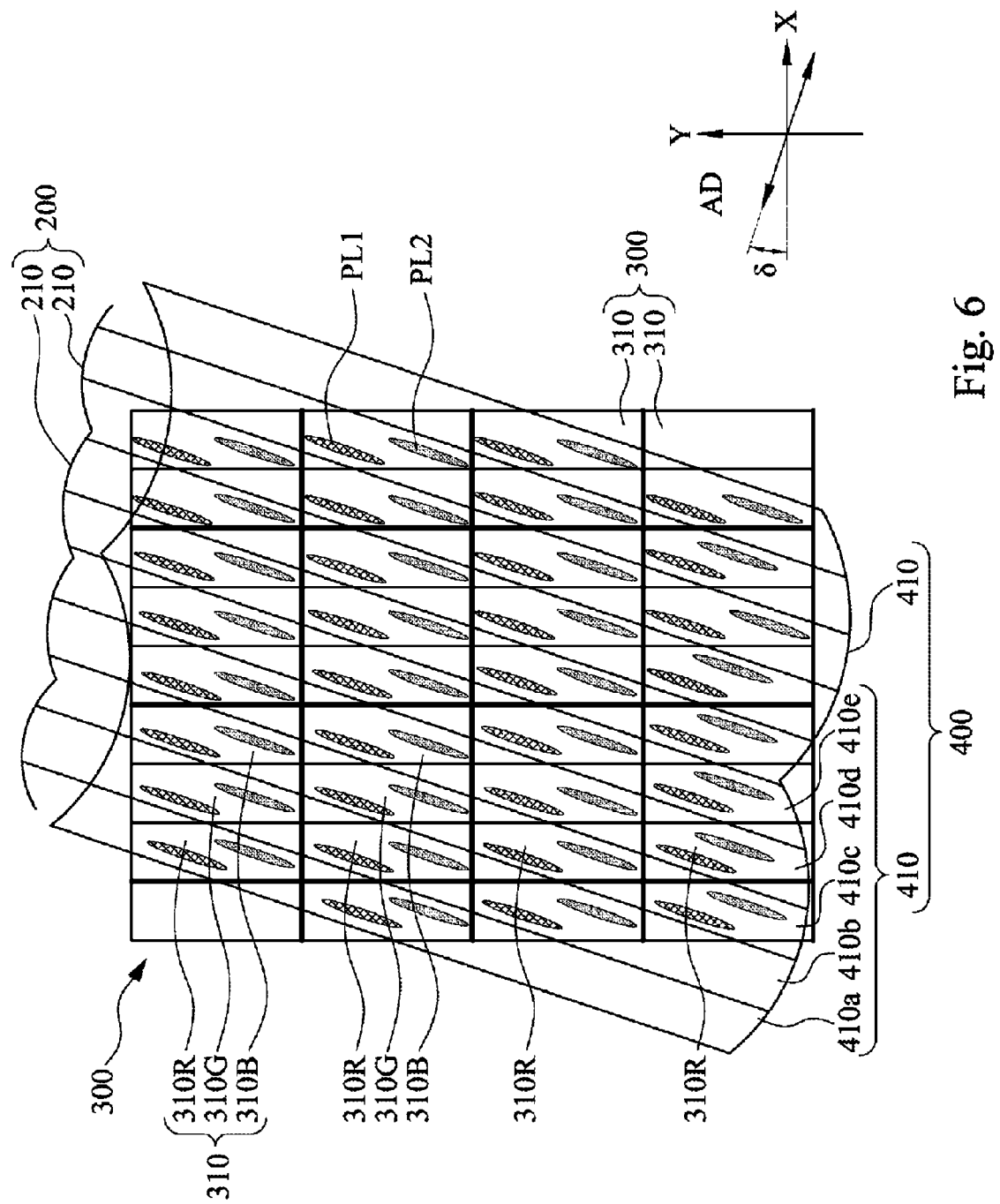
FIG. 6 is a plane schematic view of a portion of a display module of a stereo display device according to some embodiments of the present invention.

Reference is made into FIG. 4, FIG. 5, and FIG. 6. FIG. 6 is a plane schematic view of a portion of the display module 300 of the stereo display device SD according to some embodiments of the present invention. In the present embodiments, the display module 300 is disposed on a focal plane of the third cylindrical lens array 200 opposite the light guide plate 120. The display module 300 includes plural pixels 310, and each of the pixels 310 includes plural sub-pixels 310R, 310B, and 310G. Through the sub-pixels 310R/310B/310G, the first slant strip light(s) LL1 (referring to FIG. 5) is turned into first pixel lights PL1 (referring to FIG. 6), and the second slant strip light(s) LL2 (referring to FIG. 5) is turned into second pixel lights PL2 (referring to FIG. 6).

To be specific, the third cylindrical lens array 200 includes plural third cylindrical lenses 210, and a long axis of the third cylindrical lenses 210 tilts with respect to the X direction. To be specific, the third cylindrical lenses 210 are arranged along an arrangement direction AD, and the long axis of the third cylindrical lenses 210 are orthogonal to the arrangement direction AD. Herein, since the display module 300 is disposed on the focal plane of the third cylindrical lens array 200, the third cylindrical lens array 200 generates Fourier Transform of the first exiting lights EL1 and the second exiting lights EL2, which are emitted from the light guide plate 120. Therefore, the first exiting lights EL1 are naturally focused onto focusing regions CR1, and the second exiting lights EL2 are naturally focused onto focusing regions CR2, in which the focusing regions CR1 and CR2 has a long area with a long axis orthogonal with the arrangement direction AD of the third cylindrical lens array 200.

Herein, the sub-pixels 310R/310B/310G are arranged in the display module 300 in the X direction and the Y direction. In some embodiments of the present invention, a pitch between two adjacent third cylindrical lenses 210 are designed corresponding to a pitch between the sub-pixels 310R/310B/310G, so that when lights are focused onto the focusing regions CR1 and CR2, each of the sub-pixels 310R/310B/310G is disposed corresponding to the focusing regions CR1 and CR2. Each of the sub-pixels 310R/310B/310G is configured to turn the first slant strip light LL1 focused onto the focusing region CR1 into the first pixel light PL1, and turn the second slant strip light LL2 focused onto the focusing region CR2 into the second pixel light PL2. Herein, the sub-pixels 310R, 310B, and 310G may respectively include a red color filter, a blue color filter, and green color filter. The plural sub-pixels 31OR are vertically arranged along the Y direction, the plural sub-pixels 310B are vertically arranged along the Y direction, and plural sub-pixels 310G are vertically arranged along the Y direction. Through the configuration, the first pixel lights PL1 and/or the second pixel lights PL2 includes different colors. It is noted that the sequence of the sub-pixels 310R, 310B, and 310G should not limit the scope of the present invention.

In some embodiments of the present invention, the display module 300 may be a liquid crystal display panel, which may include an active device array substrate, a color filter array, a polarizer, a liquid crystal layer, an alignment layer, and so on. It is noted that, in other embodiments, the display module 300 may be any other configuration capable of controlling the pixels 310 independently.

Figure 7:
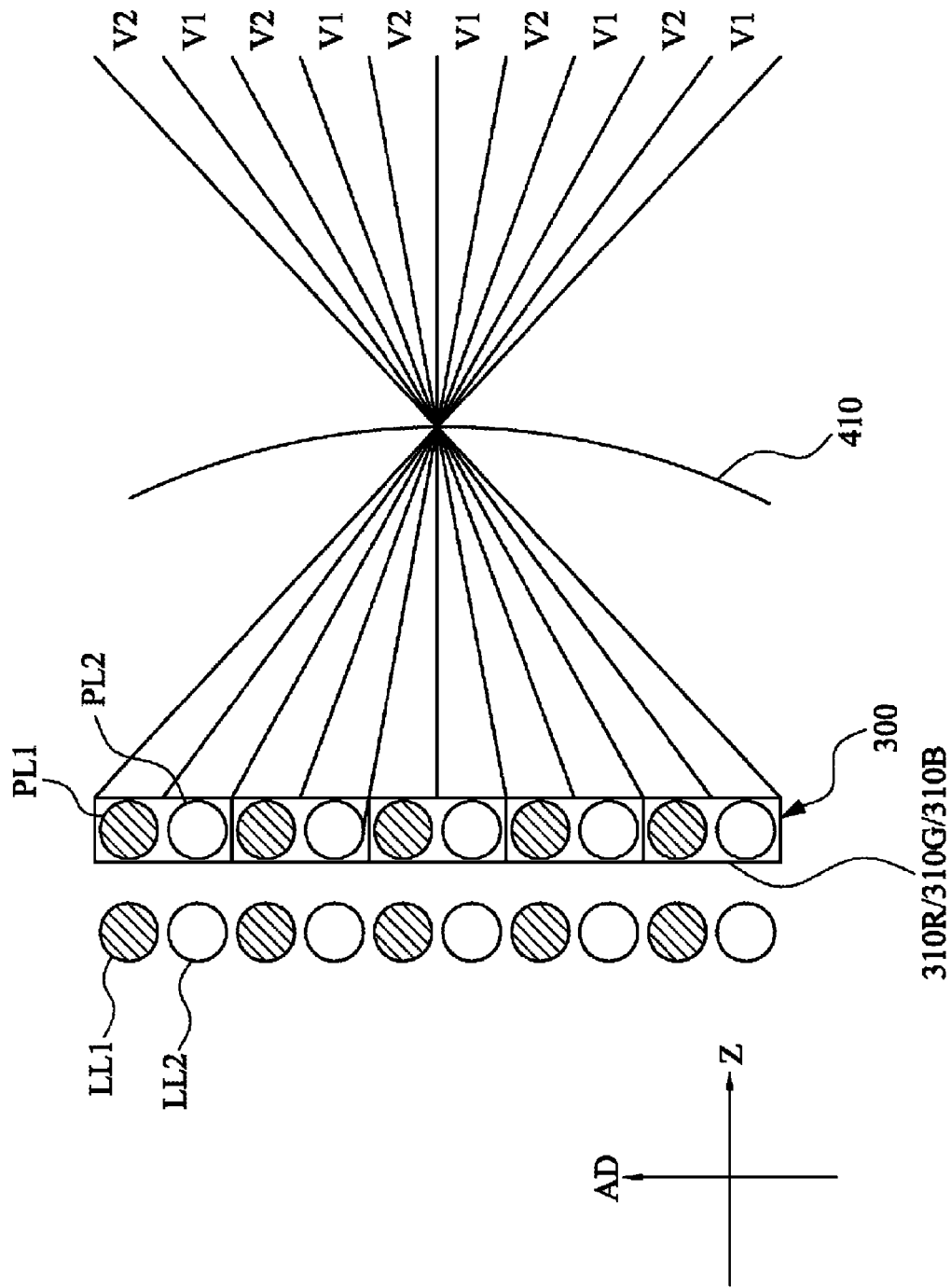
FIG. 7 is a schematic view of optical paths of a portion of a stereo display device according to some embodiments of the present invention.

Reference is made into FIG. 4, FIG. 6, and FIG. 7. FIG. 7 is a schematic view of optical paths of a portion of a stereo display device according to some embodiments of the present invention. The fourth cylindrical lens array 400 is disposed on the side of the display module 300 opposite the light guide plate 120, and the fourth cylindrical lens array 400 is configured to direct the first pixel lights PL1 into first view regions V1 respectively and direct the second pixel lights PL2 into second view regions V2 respectively. In the present embodiments, the fourth cylindrical lens array 400 includes plural fourth cylindrical lenses 410, and a long axis of the fourth cylindrical lenses 410 tilts with respect to the X direction and the Y direction. To be specific, the long axis of the fourth cylindrical lenses 410 is orthogonal to the arrangement direction AD. In some embodiments of the present invention, the arrangement direction of the third cylindrical lenses 210 is parallel to the arrangement direction of the fourth cylindrical lenses 410. That is, the fourth cylindrical lenses 410 are arranged along the arrangement direction AD. In some embodiments, of the present invention, the display module 300 is disposed on a focal plane of the fourth cylindrical lens array 400.

For clear illustration, in the figure, each of the fourth cylindrical lenses 410 is hypothetically divided into five portions 410a-410e along the arrangement direction AD, respectively corresponding to five different sub-pixels 310R, 310G, and 310B. Herein, the red sub-pixels 310R vertically arranged along the Y direction are taken as an example. The first pixel lights PL1 generated by the red sub-pixels 310R vertically arranged along the Y direction are sent to the five first view regions V1 by different portions 410a-410e respectively, and the second pixel lights PL2 generated by the red sub-pixels 310R vertically arranged along the Y direction are sent to the five second view regions V2 by different portions 410a-410e respectively. In an ideal condition, the first view regions V1 and the second view regions V2 do not overlap with each other. In other words, each of the fourth cylindrical lenses 410 is hypothetically divided into ten portions along the arrangement direction AD, respectively corresponding to right and left areas of the five sub-pixels 310R, 310G, and 310B. Therefore, the fourth cylindrical lens array 400 directs the ten pixel lights generated by the sub-pixels 310R/310B/310G to ten view regions respectively.

Herein, as shown by the figure, an angle Δ between the X direction and the arrangement direction AD is $\tan^{-1}(\frac{1}{5})$, but the scope of the present invention is not limited thereto. In other embodiments, the angle Δ between the X direction and the arrangement direction AD may have other value. For example, in other embodiments, the angle Δ may be 45 degrees, and the stereo display device is applicable to the electronic product of which the viewing direction is often changed, such as tablet computers, smart phones, and so on.

Figure 8:
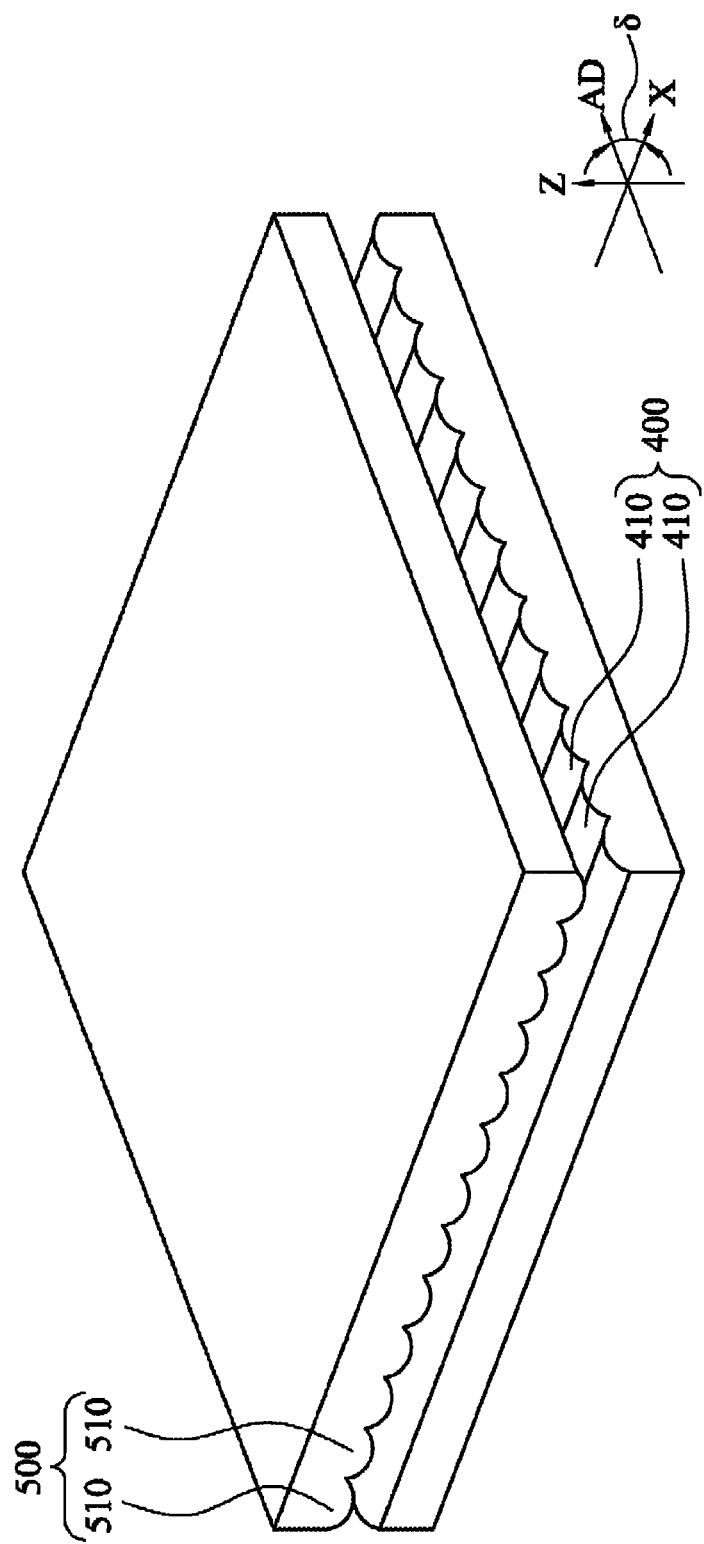
FIG. 8 is a schematic stereo view of a fourth cylindrical lens array and a fifth cylindrical lens array of a stereo display device according to some embodiments of the present invention.

FIG. 8 is a schematic stereo view of the fourth cylindrical lens array 400 and the fifth cylindrical lens array 500 of the stereo display device SD according to some embodiments of the present invention. In some embodiments of the present invention, the fifth cylindrical lens array 500 including plural fifth cylindrical lenses 510 disposed at a side of the fourth cylindrical lens array 400 opposite the light guide plate 120. The arrangement direction of the fourth cylindrical lenses 410 is orthogonal to an arrangement direction of the fifth cylindrical lenses 510. In the present embodiments, the fourth cylindrical lenses 410 and the fifth cylindrical lenses 510 are disposed facing each other. Herein, the fourth cylindrical lenses 410 and the fifth cylindrical lenses 510 are exemplarily depicted as plane-convex cylindrical lenses, and convex surfaces of the fourth cylindrical lenses 410 and the fifth cylindrical lenses 510 face each other. Through the configuration of the fifth cylindrical lens array 500, the length of the pixel lights in a direction orthogonal to the arrangement direction AD may be elongated, which means the length of the first view regions V1 and the second view regions V2 in a direction orthogonal to the arrangement direction AD may be elongated, so that a user may view stereo images easily.

Through the configuration, by controlling light sources to time sequentially emit lights (time-multiplexing) and allocating pixel lights to different view regions by the fourth cylindrical lenses 410 (spatial-multiplexing), stereo display device produces different images in ten view regions, and an image resolution that eyes of an user sense is only one-fifth of the display module 300. In other embodiments, each of the light source groups 112 may include three or more light sources operating time sequentially, thereby increasing the number of the view regions.

Figure 9:
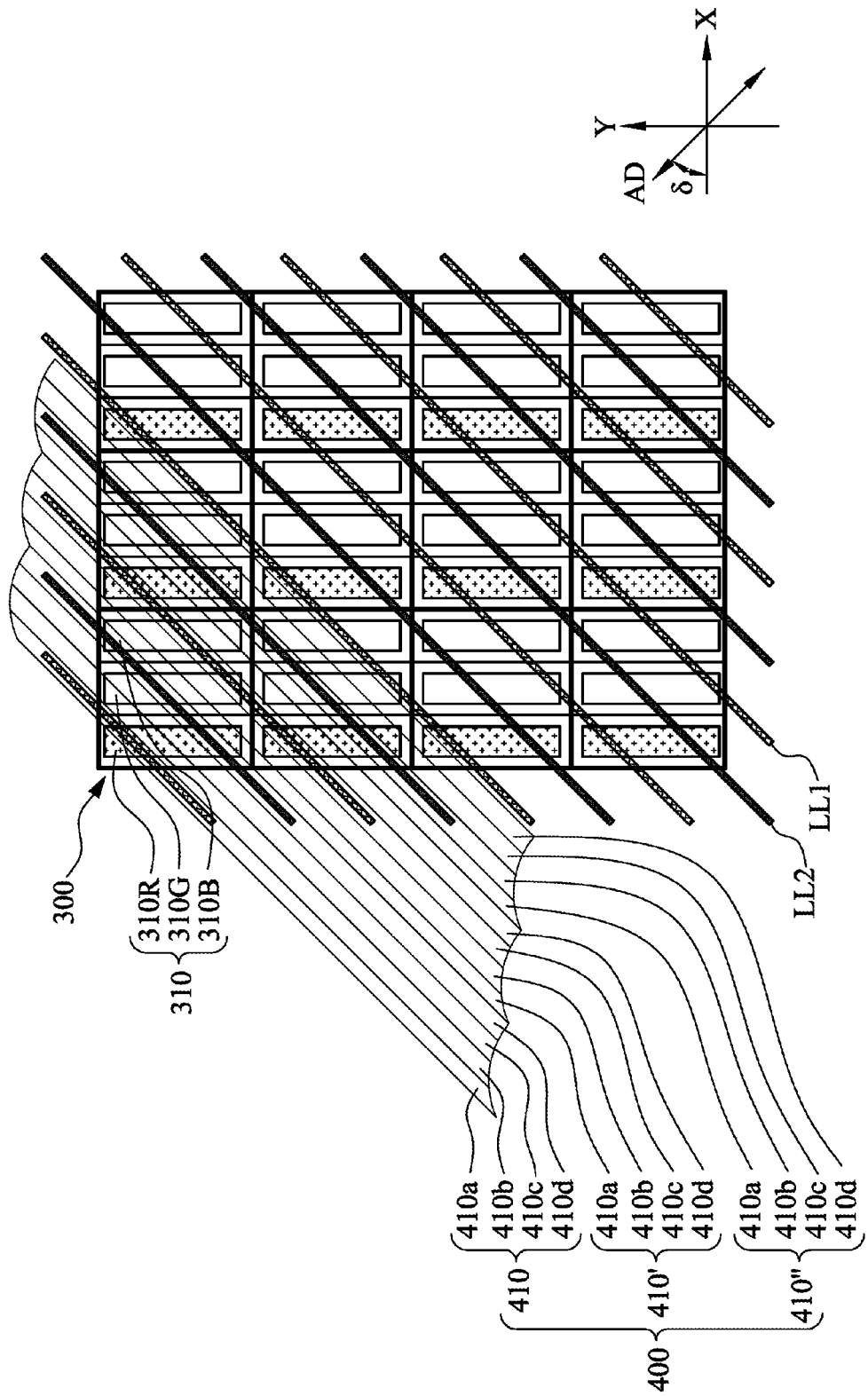
FIG. 9 is a schematic view of a portion of a display module of a stereo display device according to another embodiment of the present invention.

FIG. 9 is a schematic view of a portion of a display module 300 of a stereo display device according to another embodiment of the present invention. The present embodiment is similar to previous embodiment, and the difference between the present embodiment and the previous embodiment is that: in the present embodiment, the angle Δ between the X direction and the arrangement direction AD is 45 degrees.

For clear illustration, in the figure, each of the fourth cylindrical lenses 410 is hypothetically divided into four portions 410a-410d along the arrangement direction AD, and the two sub-pixels 310R which are vertically adjacent in the left corner are corresponding to four different portions 410a-410d. In an ideal condition, the first slant strip light LL1 and the second slant strip light LL2 are corresponding to different portions 410a, 410d, 410c, and 410b, and fills the area of the corresponding region. In other words, in X direction, each of the first slant strip light LL1 and the second slant strip light LL2 has a width of half of a width of the sub-pixels 310R. Through the configuration, in X direction, a width of each of the portions 410a, 410d, 410c, and 410b is about half of the width of the sub-pixels 310R, and a width of each of the fourth cylindrical lenses 410 is about twice the width of the sub-pixels 310R.

Herein, the red sub-pixels 310R vertically arranged along the Y direction are taken as an example. The first pixel lights (converted from the first slant strip light LL1) generated by the red sub-pixels 310R vertically arranged along the Y direction are sent to four view regions by different portions 410a-410d respectively. At another timing, the second pixel lights (converted from the second slant strip light LL2) generated by the red sub-pixels 310R vertically arranged along the Y direction are sent to the four view regions by different portions 410a-410d respectively.

For clear illustration, herein, the fourth cylindrical lenses 410, 410', and 410" indicates three adjacent fourth cylindrical lenses. In other words, each of the fourth cylindrical lenses 410, 410', and 410" is divided into four portions along the arrangement direction AD. At a first timing, the backlight module 100 generates the first slant strip light LL1 through the third cylindrical lens array 200, the first slant strip light LL1 is converted into first pixel lights by the sub-pixels 310R, and the portion 410a of the fourth cylindrical lens 410 and the portion 410c of the fourth cylindrical lens 410' send the first pixel light generated by the two vertically adjacent sub-pixels 310R into two regions, in which the first pixel light is converted from the first slant strip light LL1 by the sub-pixels 310R. At a second timing, the backlight module 100 generates the second slant strip light LL2 through the third cylindrical lens array 200, the second slant strip light LL2 is converted into second pixel lights by the sub-pixels 310R, and the portion 410d of the fourth cylindrical lens 410 and the portion 410b of the fourth cylindrical lens 410" send the second pixel light generated by the two vertically adjacent sub-pixels 310R into another two regions, in which the second pixel light is converted from the second slant strip light LL2 by the sub-pixels 310R.

As a result, the fourth cylindrical lens array 400 respectively directs the pixel lights generated by the two sub-pixels 310R to fourth view regions. Through the configuration, an image resolution that eyes of the user sense is only half of the display module 300, but the stereo display device generates different four images in the four view regions.

In the embodiments of the present invention, the cylindrical lens array and the light guide plate having reflective micro structures are designed in an edge-lit backlight module, so that exiting lights may keep their light distribution resulting from the cylindrical lens array. The light distribution may be designed in accordance with another cylindrical lens array, so that light may be focused onto a display panel of the stereo display device. In the embodiments of the present invention, through the edge-lit backlight module, the thickness of the stereo display device may be reduced, and the number of the light-emitting diode light source may be lowered while high power light sources are used.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a light guide plate having a light incident surface, a bottom surface, and a light exit surface, wherein the light incident surface adjoins the bottom surface and the light exit surface, the light guide plate comprises a micro structure on the bottom surface, and the micro structure of the light guide plate has a plane reflective surface; and
   a light source component comprising:
   a plurality of light source groups, wherein each of the light source groups comprises a first light source and a second light source, and the first light source and the second light source are arranged along an X direction and configured to time sequentially provide a first light and a second light respectively;
   a first cylindrical lens array optically coupled between the light source groups and the light guide plate, wherein the first cylindrical lens array comprises a plurality of first cylindrical lenses having optical power along the X direction, and each of the light source groups is disposed corresponding to each of the first cylindrical lenses; and
   a second cylindrical lens optically coupled between the light source groups and the light guide plate, wherein the second cylindrical lens has optical power along a Z direction orthogonal to the X direction, and wherein the first cylindrical lens array and the second cylindrical lens are configured to turn the first lights and the second lights coming from the light source groups into a first lateral incident light propagating along a first direction distribution and a second lateral incident light propagating along a second direction distribution respectively, the light incident surface of the light guide plate is configured to receive the first lateral incident light and the second lateral incident light, the plane reflective surface of the micro structure of the light guide plate is configured to turn the first lateral incident light and the second lateral incident light into a first exiting light of the first direction distribution and a second exiting light of the second direction distribution leaving the light guide plate from the light exit surface respectively, and the first direction distribution is different from the second direction distribution.

2. The backlight module of claim 1, wherein the first light source and the second light source of each of the light source groups have different distances away from an optical axis of corresponding each of the first cylindrical lenses.

3. The backlight module of claim 1, wherein the first light source and the second light source of each of the light source groups are disposed on a focal plane of corresponding each of the first cylindrical lenses.

4. The backlight module of claim 1, wherein the plane reflective surface is formed in parallel with the X direction.

5. The backlight module of claim 1, wherein the first light source and the second light source of the light source groups are disposed on a focal plane of the second cylindrical lens.

6. The backlight module of claim 1, further comprising:
   a controller configured to control the first light source and the second light source of the light source groups to time sequentially provide the first light and the second light.

7. The backlight module of claim 1, wherein the micro structure of the light guide plate comprises a reflective material on the plane reflective surface of the micro structure.

8. A stereo display device, comprising:
   the backlight module of claim 1;
   a third cylindrical lens array disposed on the light exit surface, wherein the third cylindrical lens array is configured to focus the first exiting light and the second exiting light coming from the light exit surface into a first slant strip light and a second slant strip light respectively;
   a display module disposed on a focal plane of the third cylindrical lens array opposite the light guide plate, wherein the display module comprises at least one sub-pixel configured to turn the first slant strip light into a first pixel light and turn the second slant strip light into a second pixel light; and
   a fourth cylindrical lens array disposed on a side of the display module opposite the light guide plate, wherein the fourth cylindrical lens array is configured to direct the first pixel light into a first view region and direct the second pixel light into a second view region.

9. The stereo display device of claim 8, further comprising:
   a fifth cylindrical lens array comprising a plurality of fifth cylindrical lenses disposed at a side of the fourth cylindrical lens array opposite the light guide plate, wherein the fourth cylindrical lens array comprises a plurality of fourth cylindrical lenses, and an arrangement direction of the fourth cylindrical lenses is orthogonal to an arrangement direction of the fifth cylindrical lenses.

10. The stereo display device of claim 8, wherein a plurality of the sub-pixels are arranged along the X direction, the third cylindrical lens array comprises a plurality of third cylindrical lenses, the fourth cylindrical lens array comprises a plurality of fourth cylindrical lenses, and a long axis of the third cylindrical lenses and a long axis of the fourth cylindrical lenses tilt with respect to the X direction.

11. The stereo display device of claim 10, wherein an arrangement direction of the third cylindrical lenses is parallel to an arrangement direction of the fourth cylindrical lenses.

12. The stereo display device of claim 8, wherein the display module is disposed on a focal plane of the fourth cylindrical lens array.

* * * * *